ation Priority Data
United States Patent [19]

Huber-Nuesch, deceased et al.

[11] 4,143,188
[45] Mar. 6, 1979

[54] USE OF AQUEOUS RESIN SOLUTIONS AS BINDERS AND IMPREGNATING AGENTS

[75] Inventors: Wernhard Huber-Nuesch, deceased, late of Basel, Switzerland, by Susy Huber-Nuesch, heir; by Fabienne Huber, heir; by Ariane Huber, heir, both of Basel, Switzerland

[73] Assignee: Ciba-Geigy Corporation, Ardsley, N.Y.

[21] Appl. No.: 811,663

[22] Filed: Jun. 30, 1977

[30] Foreign Application Priority Data

Jun. 30, 1976 [CH] Switzerland .................. 8392/76

[51] Int. Cl.$^2$ .................. C08G 59/26; C08K 3/34
[52] U.S. Cl. .................. 427/386; 260/29.2 EP; 260/37 EP; 427/393; 428/413; 521/63; 528/367; 528/481
[58] Field of Search .................. 260/29.2 EP; 427/386; 428/413

[56] References Cited

U.S. PATENT DOCUMENTS

| | | | |
|---|---|---|---|
| 3,211,675 | 10/1965 | Johnson | 260/29.2 EP |
| 3,240,736 | 3/1966 | Beckwith | 260/29.2 EP |
| 3,310,511 | 3/1967 | Reinert | 260/29.2 EP |
| 3,391,097 | 7/1968 | Williamson | 260/29.2 EP |
| 3,477,979 | 11/1969 | Hillyer | 260/29.2 EP |
| 3,798,191 | 3/1974 | Donnely | 260/29.2 EP |
| 3,926,886 | 12/1975 | Kelley et al. | 260/29.2 EP |
| 3,988,279 | 10/1976 | Klassen | 260/29.2 EP |
| 4,018,721 | 4/1977 | Cotter et al. | 260/29.2 EP |
| 4,046,937 | 9/1977 | McCaskey et al. | 260/29.2 EP |

FOREIGN PATENT DOCUMENTS

| | | | |
|---|---|---|---|
| 471811 | 4/1969 | Switzerland | 260/29.2 EP |
| 1122414 | 8/1968 | United Kingdom | 260/29.2 EP |

*Primary Examiner*—Murray Tillman
*Assistant Examiner*—Arthur H. Koeckert
*Attorney, Agent, or Firm*—Joseph P. DiPrima

[57] ABSTRACT

An aqueous solution of a glycidyl compound containing a N-heterocyclic group and of an amine hardener is used for the modification, sealing or binding of substrates.

22 Claims, No Drawings

USE OF AQUEOUS RESIN SOLUTIONS AS BINDERS AND IMPREGNATING AGENTS

The invention relates to the use of aqueous solutions of epoxide resins and amine hardeners as binders and impregnating agents for the modification, sealing or binding of substrates, particularly as binders for loose aggregates, and as sealing agents for porous materials.

Water-soluble glycidyl compounds containing N-heterocyclic groups and the use of these compounds in various industrial fields are already known, e.g. from the Swiss Pat. Specification No. 471811. They are used, e.g., as textile auxiliaries and dyeing auxiliaries together with dyes containing at least one reactive amino group, and serve to effect fixation of the dyes or as finishing agents on fabrics of all kinds. Fixation occurs in consequence of the heating of the impregnated substrates. These compounds are used together with water-miscible solvents. They can also be used as bonding agents for fibre fleeces or for the improvement of rubber-fabric compounds, in which case they are applied, for example, in the form of aqueous solutions together with hardeners, such as amine hardeners, to the fibre material; hardening or curing is subsequently effected by heating the impregnated material.

In one example there is described the bonding of concrete prisms, which had been left for at least 24 hours in water, with a pourable mortar composed of N,N'-diglycidyl-5,5-dimethylhydantoin, 3-cyclohexylamino-propylamine, quartz sand and quartz flour, with subsequent standing at room temperature for several days. The application of an aqueous solution of the resin/hardener system is not mentioned.

The British Pat. Specification No. 1,122,414 discloses aqueous coating agents containing a water-soluble perhydrotriazine having 2 or 3 glycidyloxyethylcarbonyl groups, a water-soluble cross-linking agent, such as polyamines or salts thereof, and water. The mixtures can be used as cold setting lacquers for spray lacquering, immersion lacquering, brush lacquering and roller lacquering of wood, metal and brickwork. The use of hardeners according to the present invention is not described.

In the Swiss Pat. Specifications Nos. 523278 and 523279 are mentioned mixtures of hydantoin- or uracyl-diglycidyl compounds and amine hardeners as binders for mineral aggregates and as impregnating resins. Aqueous solutions of such mixtures are not described.

In the German Auslegeschrift No. 1,669,181 there is described a process for producing binders based on alkali silicate solutions, to which are added triglycidylisocyanurate which is scarcely water-soluble and water-soluble amines. The mixtures, diluted with water, can be used together with cement for binding mineral granules. After hardening for several hours at room temperature, there are obtained shaped bricks having a high resistance to water.

A process for impregnating porous materials, such as concrete, asbestos cement, mortar, gypsum or porous natural stone is described in the U.S. Pat. Specification No. 3,850,661. According to this patent specification, impregnation is effected with liquid, anhydrous epoxide resin/hardener mixtures: polyamines are used as hardeners. The treated surfaces are resistant to water and to chemicals. The use of aqueous compositions is neither mentioned nor rendered obvious.

In the Russian Pat. Specification No. 184691 is described the production of concrete and mortar having a reduced perviousness to water. In this process, diethylene glycol diglycidyl ethers or triethylene glycol diglycidyl ethers with polyethylenepolyamine are added to the cement/filler/water mixture. Setting of the concrete occurs at room temperature.

In the French Pat. Specification No. 1,289,935 is disclosed in the Examples the production of lightweight concrete, whereby there is used a mixture of aliphatic water-insoluble epoxide resin and hardener for epoxide resins, cement, sand and foaming agent. An aqueous dispersion of polyglycidyl ether of pentaerythritol, N-cyclohexylpropylene-diamine-(1,3) and hydrogen peroxide can be added to the cement/sand mixture and finely dispersed therein. Setting is complete after 30 minutes.

In a further French Pat. Specification No. 1,284,841 is described the production of light-weight structural elements of high mechanical strength. There are used herein aqueous dispersions, containing an amine hardener for epoxide resins, of aliphatic, water-insoluble polyepoxide compounds, which are mixed with a mixture of polystyrene and cement, limestone, mortar, sand, gravel or fibers, and allowed to set. Epoxide resins containing an N-heterocyclic group are not mentioned.

A water-miscible, hydraulic, pulverulent binder mixture containing epoxide resin and an amine hardener is described in the German Auslegerschrift No. 1,226,475. The water-insoluble epoxide compounds are absorbed by a finely divided carrier material. A mortar mixture having increased flexibility but lower compressive strength is obtained by adding cement and water.

At no point in the publications mentioned is there a suggestion of the use of specific amines with specific epoxides, dissolved both together in water, and applied in this form for hardening. It has been found namely that an aqueous solution of water-soluble N-heterocyclic epoxide compounds and specific water-soluble amines, when used as a binder or impregnating agent, is able to impart to the substrates sealed or modified therewith excellent mechanical, chemical and, in particular, water-resistant properties. It has to be considered surprising that water-resistant addition products are obtained from two water-soluble constituents in water.

The invention relates to the use of an aqueous solution of epoxide resins, which are completely water-soluble at room temperature and which have at least one N-heterocyclic ring in the molecule, and amines containing at least three hydrogen atoms bound to nitrogen, the solubility of which epoxide resins in water is at least 70 percent by weight, as binder and impregnating agent for the modifying, sealing or binding of substrates, especially as binder for loose aggregates and as sealing agent for porous materials, which aqueous solution is characterised in that as amines there are used those which satisfy the condition of the formula I $$(a \cdot w/c) < 14 \tag{I}$$

wherein a represents the H-active amine equivalent, w represents the sum of the amino groups, the hydroxyl groups and the ether groups, with two ether groups counting as one group, and c represents the number of carbon atoms in the molecule, or the water-soluble salts thereof. Basic primary, secondary and tertiary amino groups count as amino groups. The H-active amine equivalent of the amine compound is the molecular weight divided by the total number of hydrogen atoms bound to nitrogen of the amine compound.

After the dissolving of resin and hardener in water, there is formed from the clear solution within a few minutes up to two hours - depending on concentration and temperature - firstly a a milky cloudiness (emulsion), which then precipitates as a liquid phase from the aqueous phase and, surprisingly, hardens or sets, in the presence of water, to form a compact, water-resistant, infusible substance. This reaction occurs even when the concentration of epoxide resin and polyamine is only 0.5 percent by weight. The concentration of these two constituents for application according to the invention is generally 1–90 percent by weight, preferably 5–80 percent by weight.

The dissolving of the two reactants in water is performed as a rule at room temperature. Advantageously, the epoxide resin is dissolved on its own in water until completely in solution, and the polyamine is then added, optionally dissolved in water. It is also possible however to mix epoxide resin and polyamine and dissolve them together in water. For the purpose of increasing the pot life of the solution, the dissolving of the reactants can be performed in cold water, advantageously in ice-cold water. Alternatively, the reactivity of the polyamines can be lowered by partial conversion into salts.

The hardening in the aqueous solution is effected as a rule at room temperature, but it can be performed at temperatures from below 0° to 40° C., or at still higher temperatures. The provision of heat is not necessary. For example, a 50% solution of hydantoin resin can be hardened at −5° C., although the solution is frozen. After the water has melted, the major part of the reaction product is in the form not of a compact solid but of a hard network or hard sponge-like structure.

Applicable liquid epoxide resins are, e.g., the following: N-glycidyl compounds of hydantoin and also glycidyl ethers of addition products of alkylene oxides with hydantoins. Water-soluble hydantoin epoxides of this kind are described, for example, in the Swiss Patent Specifications Nos. 471811 and 523273, in the French Pat. Specifications Nos. 2,163,160 and 2,080,885, as well as mixtures thereof in the Austrian Pat. Specification No. 298807. Also suitable are N-glycidyl compounds and glycidyl ethers of ethylene urea, of barbituric acid, of uracil, of cyanuric acid, of parabanic acid and of triacrylylperhydrotriazine.

The following water-soluble resins are preferably used:

(a) N,N'-diglycidyl-5,5-dimethyl-hydantoin,
(b) N,N'-diglycidyl-5-methyl-5-ethyl-hydantoin,
(c) 1-glycidyl-3-(2-glycidyloxy-n-propyl)-5,5-dimethyl-hydantoin,
(d) a mixture of about 70% of polyepoxide a) and 30% of polyepoxide c),
(e) 1,3-bis-(1-glycidyl-5,5-dimethyl-hydantoinyl-3)-propanol-2-glycidyl ether,
(f) a mixture of three equal parts of polyepoxides (b), (c) and e), and
(g) the glycidyl ether addition product of triacrylylperhydrotriazine according to the French Pat. Specification No. 1,267,432.

Applicable solid epoxide resin which is soluble at room temperature in water is:

(h) triglycidyl ether of cyanuric acid.

Polyamines which fulfill the condition of the formula I are, for example, the following:

| | Value of the formula I |
|---|---|
| 1. 1-methyl-4-(1,1-dimethyl-aminomethyl)-cyclohexylamine | 8.5 |
| 2. 2-aminomethyl-cyclopentylamine | 9.5 |
| 3. 2-oxo-1,3-hexahydropyrimidine-di-neo-pentylamine | 9.6 |
| 4. 3,5,5-trimethyl-3-(aminomethyl)-cyclo-hexylamine | 8.5 |
| 5. 3-amino-1-cyclohexyl-amino-propane | 11.6 |
| 6. 3,3'-dimethyl-4,4'-diamino-dicyclohexyl-methane | 8.0 |
| 7. m-xylylidenediamine | 8.5 |
| 8. trimethylhexamethylenediamine | 8.8 |
| 9. 1-cyclohexyl-4-amino-3-amino-methylpiperidine | 13.3 |
| 10. 1-phenyl-propylenediamine | 8.4 |
| 11. 3,3-bis-(γ-aminopropyl)-2-methylpiperidine | 10.7 |
| 12. 4a-(γ-aminopropyl)-8a-methyl-decahydro-1,8-naphthyridine | 13.3 |
| 13. 1,3-diphenyl-propylenediamine | 7.5 |
| 14. 2,2-bis-(γ-aminopropyl)-propionaldehyde-neopentyl glycol acetal | 13.8 |
| 15. hexamethylenediamine | 9.7 |
| 16. 1,2-diaminocyclohexane | 9.5 |
| 17. 1,4-bis-(aminomethyl)-cyclohexane | 8.9 |

Particularly preferred are those polyamines which satisfy the formula Ia $$\frac{a \cdot w}{c} = 7 \text{ to } 12 \qquad (Ia).$$

There are preferably used the salts of such amines, especially those salts which are formed from 1 mole of amine and 0.5–1 mole of monobasic acid.

The aqueous solutions are used according to the invention as binders, preferably for loose aggregates, and also as "mixed binders" in combination with hydraulic binders. They are suitable for binding or sealing mineral or metallic aggregates, such as quartz flour, stone powder, kaolin, alumina, metal powders, fine sands, coarse sands, limestone, gravel, soil, aluminium shot, glass fibres, asbestos fibres, glass cloth, etc.; also for sealing or bonding organic materials, such as cork chips, sawdust, cotton fibres, paper, plastics chips, synthetic fibres, etc. Furthermore, the solutions can be used as adhesion promoters between old and new concrete. They are used in addition for modifying porous substances, i.e. for impregnating, compacting, sealing and coating of absorbent substrates, such as concrete, mortar, sandstone, marble, brickwork, plaster, clay, limestone, gypsum, ceramics, artificial stone, wood, etc. In all cases there is obtained a consolidating of the material and also, depending on the applied amount of resin/hardener, an improvement in the behaviour under mechanical stress, in the resistance to frost, to atmospheric conditions and to chemicals, particularly to salts, oils and fats. The depth of penetration of the aqueous solutions is dependent on the porosity of the material, on the concentration of the solutions and on the wetting properties. The last-mentioned are enhanced by the addition of a customary wetting agent. The solutions may of course be applied also when the material to be treated is moist. If required, for example in the treatment of brittle sandstone, the material can be soaked with water prior to application of the solution. Besides depending on the properties of the material and on the application process, the choice of concentration of the solutions and of the amount of resin/hardener to be applied will depend on the effect desired. Where the pores of the material are not to be sealed, it is advantageous to operate with a concentration of 5 to 20%. If the first treatment has not produced an adequate consolidation effect, a second application can be made after evaporation of the water. As a rule, an amount of 50-100 g of resin/hardener per square meter is sufficient. In the case where a greater consolidation or a sealing of the surface of the material is desired, the substrate can be treated at the start with a 15-25% solution. For highly absorptive substrates, particularly in the case of old porous concrete, the amount applied is about 100-350 g of resin/hardener per square meter. Finally, the deepest possible anchoring of the modifying or binding agent up to the actual coating can be effected by commencing with a 5-10% solution and sealing off finally with a 15-50% solution. Relatively dilute solutions are suitable also for producing films on surfaces of new concrete in order to thus prevent the premature evaporation of the water, and to simultaneously impart to the subsequently dried concrete a protective layer.

Since the solutions can also be applied to moist objects, they are suitable as sealing material for concrete tubes and asbestos cement articles of all kinds. As is known, it is difficult to seal the objects which arrive from the place of manufacture frequently moist inside. The solutions are suitable also for producing so-called primers on poor concrete. The concrete is consolidated or hardened with 5-25% solutions without the pores becoming completely sealed. It is then possible to apply to the hardened base a coating using the desired epoxide resin system.

Solutions with a relatively high concentration of 30 to 80 percent by weight of resin and hardener naturally have a poorer penetration capacity, and the impregnating agent can on finely porous materials become concentrated on the surface. The pot life is moreover short, unless the solutions are kept at 0°-5° C.

The application of the aqueous solutions to the surfaces to be impregnated is simple. They can be applied with a brush or with known spraying devices. The object can if required be treated also by immersion in the solution.

To the aqueous solutions can essentially be added any water-soluble or water-dispersible substances, provided that these do not impair the hardening process or do not significantly lower the penetration capacity. The following additives may be mentioned: fungicides, herbicides, biocidal agents, dyes, pigments, corrosion inhibitors, water-repellents, thickeners, wetting agents for lowering surface tension, etc.

For use in the building industry, the solutions can be advantageously mixed with hydraulic binders. Two hardening processes then occur in the same aqueous phase. In the first place there occurs the hardening of the hydraulic binders, namely cement, lime, Sorel cement or gypsum, and in the second place the hardening of the epoxide resins and polyamines according to the invention.

A further advantage of the application according to the invention is that the solutions are strongly alkaline. They are therefore excellently compatible with the aqueous preparations, likewise strongly alkaline, which are obtained with cement and lime. With hardening in water there remains in the end product a certain amount of water, which is evaporated off at room temperature only after a considerable period of time, and this retention of water has an advantageous effect on the setting of cement.

The amount of epoxide resin and polyamine added to aqueous preparations containing cement, lime, preferably calcium hydroxide, or gypsum can vary within wide limits. Relative to 100 parts by weight of the hydraulic binder, 1 to 100, preferably 5 to 50, parts by weight of resin/hardener can be added. The improvements relate principally to the mechanical properties, to the reduction of cracking and to the increased resistance to inorganic and organic chemicals. As a rule, the epoxide resin and the polyamine are dissolved in the amount of water required for the hydraulic binder, and this solution is used as mixing liquor for the preparation with cement, lime and gypsum or for the concrete or mortar mixture. It is obvious that with constant processing consistency of a cement/sand mixture the water/cement factor becomes automatically smaller by the addition of the liquid resin/hardener mixture. The addition of resin/hardener to cement mixtures is suitable, in particular, for the production of prefabricated elements of all kinds, for the manufacture of floor coverings, of fillers and sealing compounds, as well as for the production of light-weight concrete.

In the following are illustrated some properties of objects which have been formed by solutions usable according to the invention ('parts' denote parts by weight; percentages are, except where otherwise stated, percent by weight):

(a) GLASS TRANSITION TEMPERATURE

A 5% and a 50% aqueous solution are produced from 100 parts of a mixture of 70 parts of N,N'-diglycidyl-5,5-dimethyl-hydantoin and 30 parts of 1-glycidyl-3-(2-glycidyloxy-n-propyl)-5,5-dimethyl-hydantoin and 31 parts of 3,5,5-trimethyl-3-(aminomethyl) cyclohexylamine; after 24 hours the overlying aqueous solution is poured off, and the solids obtained by reaction are kept at room temperature for 7 days, whereupon the glass transition temperature Tg is determined:

Tg for the solid from the 5% solution: 56° C.
Tg for the solid from the 50% solution: 50° C.

(b) Compressive strength

A 20% aqueous solution is produced from 100 parts of a resin and 31 parts of a hardener. The solid reaction products obtained are dried for 20 days in the one case at room temperature and in the other case at 40° C.; the compressive strength in $N/mm^2$ is then determined on test specimens of 1 $cm^3$. The results are shown in the following Table.

| Resin | Hardener | Compressive strength $N/mm^2$ after 20 days at | |
|---|---|---|---|
| | | RT* | 40° C. |
| mixture of 70 parts of N,N'-diglycidyl-5,5-dimethylhydantoin and 30 parts of 1-glycidyl-3-(2-glycidyloxy-n-propyl)-5,5-dimethyl-hydantoin | 3,5,5-trimethyl-3-(aminomethyl)-cyclohexylamine | 31 | 43 |
| N,N'-diglycidyl-5-methyl-5-ethyl-hydantoin | 3,5,5-trimethyl-3-(aminomethyl)-cyclohexylamine | 33 | 45 |
| N,N'-diglycidyl-5-methyl-5-ethyl-hydantoin | trimethylhexa-methylenediamine | 21 | 27 |

*room temperature

(c) COLD-WATER ABSORPTION

The mean cold-water absorption of solids which have been formed from 10–50% solutions and which have then been stored for 6 months at room temperature is shown in the following Table:

| Resin | Hardener | water absorption in % after | | |
|---|---|---|---|---|
| | | 1 day | 4 days | 10 days |
| N,N'-diglycidyl-5-methyl-5-ethyl-hydantoin | 2-aminomethyl-cyclopentylamine | 1.6 | 3.1 | 4.9 |
| N,N'-diglycidyl-5-methyl-5-ethyl-hydantoin | 2-oxo-1,3-hexa-hydropyrimidine-di-neopentylamine | 1.0 | 1.5 | 2.1 |
| N,N'-diglycidyl-5-methyl-5-ethyl-hydantoin | 3-amino-1-cyclohexyl-aminopropane | 0.4 | 0.75 | 0.89 |
| 1-glycidyl-3-(2-glycidyloxy-n-propyl)-5,5-dimethyl-hydantoin | 3,3,5-trimethyl-3-(aminomethyl)-cyclohexylamine | 3.3 | 5.9 | 8.8 |
| 1,3-bis-(1-glycidyl-5,5-dimethyl-hydantoinyl-3)-propanol-2-glycidyl ether | 3,3,5-trimethyl-3-(aminomethyl)-cyclohexylamine | 2.2 | 4.5 | 7.0 |

(d) INCREASE OF THE POT LIFE OF THE SOLUTIONS WITH USE OF THE SALTS OF THE AMINE HARDENERS

(d1): Carbonates

To a solution of 32 parts of trimethylhexamethylenediamine in 400 parts of water are added 8.1 parts of carbon dioxide in solid form (to 1 mole of hardener 1 mole of $CO_2$). There are then added to the solution 100 parts of N,N'-diglycidyl-5-methyl-5-ethyl-hydantoin.

The pot life of this 25% solution, i.e. the time until a milky emulsion is formed, is at room temperature about 4 hours; without the formation of carbonates it is only about 10 minutes.

Two samples of this solution, 10 g and 150 g, are placed in an oven at 130° C. for 10 minutes and 1 hour. In both cases the reaction commences after a few minutes. Carbon dioxide is given off and hardening to give the final product occurs in solution.

The hardening of resin/hardener in the initially mentioned solution occurs at room temperature after about 12 hours.

(d2): Acetate

In the practical application of aqueous solutions of hardeners which, for the purpose of lengthening the pot life, contain amine salts, it has proved advantageous if resin with hardener can be measured off volumetrically, and for the sake of simplicity in the volume ratio of 1:1. Relative to N,N'-diglycidyl-5-methyl-5-ethyl-hydantoin having about 7.5 epoxide groups/kg and a density of 1.2, there are produced, for example with the hardener 3,3,5-trimethyl-3-(aminomethyl)-cyclohexylamine, by dissolving in water, 38% g/v (weight/vol.%, i.e. 38 g/100 ml) solutions. The partial amine salt, which corresponds to one molar equivalent of 2 moles of amine and 1 mole of acetic acid, is produced by dissolving 380 g of the hardener in about 500 g of water, adding 67 g of glacial acetic acid, and then making up the mixture with water to 1 liter of solution.

The following hardener standard solutions A, B, C and D are prepared:

| | | |
|---|---|---|
| standard solution A | 38% g/v of | 3,5,5-trimethyl-3-(aminomethyl)-cyclohexylamine, |
| standard solution B | 38% g/v of | 3,5,5-trimethyl-3-(aminomethyl)-cyclohexylamine/acetate 2:1, |
| standard solution C | 36% g/v of | trimethylhexamethylenediamine, and |
| standard solution D | 36% g/v of | trimethylhexamethylenediamine/carbonate 2:1. |

100 ml of each of these standard solutions is mixed in each case with 100 ml of N,N'-diglycidyl-5-methyl-5-ethyl-hydantoin and 3000 ml of water to give approximately 5% (g/v) solutions; and 200 ml of each of the standard solutions is mixed in each case with 200 ml of resin and 3000 ml of water to give approximately 9% (g/v) solutions. The pot life of these solutions is measured at two different temperatures, at 10°–12° C. and 20°–22° C. initial temperature (the final temperature is about 5° C. higher), and is shown in the following Table in minutes:

| Solution with use of the standard solution | Initial temp. 10–12° C | | Initial temp. 20–22° C | |
|---|---|---|---|---|
| | 5% solution | 9% solution | 5% solution | 9% solution |
| A | 100 | 50 | 50 | 20 |
| B | 120 | 75 | 90 | 40 |
| C | 70 | 30 | 90 | 15 |
| D | 90 | 60 | 70 | 40 |

The pot life of solutions containing amine salts as the hardener component is clearly longer.

In the following Examples, the employed resin and hardener components are denoted by a letter (a to h) and a number (1 to 16), respectively, according to the initially given enumeration.

EXAMPLES

1. FLOOR COVERING

Depending on the concentration and on the amount of the aqueous solution, as well as on the respective composition of the grain sizes of the aggregates (sieve lines), there are obtained porous to sealed surfaces. With a relatively large proportion of fine grain and with solutions having a concentration of 40–80%, coatings which are virtually free from pores are as a rule obtained. Porous structures are obtained advantageously with solutions which have a concentration of 5–30% and which contain additives having a relatively small proportion of fine grain.

| Mixture | Parts of sand 0.1-0.3 mm | Parts of sand 0.5-0.75 mm | Parts of sand 0.8-1.2 mm | Quartz flour | BaSO$_4$ | Parts of binder | Parts of water | Ratio of binder to additives |
|---|---|---|---|---|---|---|---|---|
| I | 330 | 170 | 330 | 85 | — | 131 | 50 | 1:7 |
| II | 330 | 170 | 330 | 80 | 250 | 131 | 100 | 1:8,9 |

The binders are composed as follows: to 100 parts of epoxide resin b) are used 35 parts of a mixture of 17 parts of polyamine 8 and 18 parts of polyamine 4.

Both mixtures I and II are readily flowable and have good working properties. Vessels and tools can be cleaned with water. The coatings harden in 5-6 hours at room temperature and give a sealed surface.

The ball-pressure hardness according to DIN 53456 in N/mm$^2$ is 122 for I and 86 for II.

2. FLOOR COVERING

The use of the solutions combined with cement is suitable for producing floor coverings.

| Mixture | Parts of sand 0.1-0.3 mm | Parts of sand 0.8-1.2 mm | Parts of cement | Parts of binder | Parts of water | Ratio of binder to cement + sand | Water/cement value |
|---|---|---|---|---|---|---|---|
| III | 700 | 700 | 440 | 184 | 170 | 1 : 10 | 0,39 |
| IV | 700 | 700 | 440 | 263 | 125 | 1 : 7 | 0,28 |
| V | 200 | 345 | 220 | 125 | 110 | 1 : 7 | 0,5 |
| VI | 200 | 345 | 220 | 125 | 110 | 1 : 7 | 0,5 |

The binders are composed as follows:
III : to 100 parts of the epoxide resin f) are used 38 parts of the mixture of polyamine 4 and polyamine 8 in the ratio of 1:1;
IV: to 100 parts of a mixture of the epoxide resins c) and e) in the ratio of 4:1 are used 38 parts of the mixture of polyamine 4 and polyamine 8 in the ratio of 1:1;
V and VI : to 100 parts of the epoxide resin b) are used 34 parts of polyamine 4 and 8 respectively.

All mixtures are flowing types and can be applied, with the customary tools, in layers of 3 to 8 mm. The variants V and VI, adjusted to be thinly liquid, have the best working properties. The spreadable life (pot life) of all the mixtures is, compared with that of cement mortars containing only cement, greatly shortened on account of the reactivity of the binder solutions, and hard coatings are obtained already after 4 to 6 hours. The hardening of the coatings occurs at room temperature. The following ball-pressure hardnesses (DIN 53456) are measured after about 30 days:
III : 95 N/mm$^2$
IV : 137 N/mm$^2$
V : 141 N/mm$^2$
VI : 107 N/mm$^2$.

For clarification of the following Examples 3 to 8, which relate to mortar or cement mortar, the following data is given:
mortar, abbreviated to M, is composed of
36% of quartz sand 0.1-0.3 mm,
19% of quartz sand 0.5-0.75 mm,
36% of quartz sand 0.8-1.2 mm, and
9% of quartz flour "K8";
cement mortar, abbreviated to CM, varies in composition:
standard type CM 540 contains 540 kg of cement per m$^3$,
type CM 320 contains 320 kg of cement per m$^3$, and
type CM 195 contains 195 kg of cement per m$^3$.
The percent composition is as follows:

| Cement mortar | Quartz sand <1 mm | 1-3 mm | 3-5 mm | Cement | Ratio cement:sand |
|---|---|---|---|---|---|
| CM 540 | 25 | 25 | 25 | 25 | 1:3 |
| CM 320 | 28,6 | 28,6 | 28,6 | 14,2 | 1:6 |
| CM 195 | 30,5 | 30,5 | 30,5 | 8,5 | 1:11 |

Except where otherwise stated, the hardening of the CM prisms occurs during:
- 28 days under water, 28 D H$_2$O, or
- 7 days in a moist atmosphere (100% relative humidity at room temperature) and 21 days at room temperature 28 D RT, or
- 21-28 days in climatic test cabinet (20° C./65%) CC.

The mode of adding the binder is either according to method I or according to method II:
I : premix sand and as required cement, add binder and then as much water as is necessary to give the consistency desired;
II : premix sand and as required cement, dissolve binder in calculated amount of water, and then add this solution: effect any subsequent correction necessary by adding water.

The consistency of the mortar types is such that the material can be tamped. The prisms are produced without vibration. The consistency of the cement mortar is adjusted in all cases to give a soft plastic material. Vibration is applied for 2 × 3 minutes. The mechanical tests are performed on prisms 4 × 4 × 16 cm; the flexural tensile test is carried out according to the 4 point system. The compressive strength is measured on the fractured pieces remaining after the flexural tensile test (SIA standard). Three prisms are as a rule tested for each result: thus the flexural tensile test value is the average value from three specimens and the compressive strength value is the average from six specimens.

3. MORTAR

Mortar mixtures are prepared according to the preceding method I. For comparison, there are produced mixtures in which are used, instead of amines satisfying the formula I, amines having a higher formula value. After hardening during 4 weeks at room temperature, partially under water, the flexural tensile strength and the compressive strength of the prisms obtained are measured. The results are shown in the following Table.

| Mixture | Filing degree | Water: binder | Hardening time at RT | Flexural tensile strength kp/cm² | Compressive strength kp/cm² |
|---|---|---|---|---|---|
| resin d) hardeners 6 and 4 (ratio 5:4) | 1:7 | 0.29 | 28 days | 96 | 426 |
| resin d) triethylenetetramine (formula value 16) | 1:7 | 0.29 | 28 days | 70 | 281 |
| resin b) hardener 4 | 1:33 | 3 | 14 days + 14 days H₂O | 10 | 50 |
| resin b) triethylenetetramine (formula value 16) | 1:33 | 3 | 14 days + 2h H₂O | decomposition after 2 h H₂O | |

The use of hardeners of which the formula value is $(a \cdot w/c) > 14$ leads to products which are not water-resistant and which have considerably poorer mechanical properties than those obtained using hardeners which satisfy the formula I.

4. CEMENT MORTAR

Cement mortar mixtures are produced according to method I or II. For comparison, there are again used mixtures in which are contained hardeners which do not satisfy the formula I.

The following Table shows the mixtures employed:

| Mixture designation | Mixture | Filing degree | Binder relative to cement | Water: binder | Water: cement | Mixing method |
|---|---|---|---|---|---|---|
| α | CM 540 : resin b) + hardener 4 | 1:16 | 25% | 1.1 | 0.27 | 1 |
| β | CM 540 : resin d) + NH₂—CH₂—CH₂—[—O—CH₂—CH—]ₙ—NH₂ <br>                                         CH₃ <br> n ~ 2,6 (formula value 17) | 1:16 | 25% | 1.0 | 0.25 | 1 |
| γ | CM 540 : resin b) + hardener 4 | 1:16 | 25% | 1.0 | 0.25 | 1 |
| δ | CM 540 : resin d) + hardener 4 | 1:18 | 22% | 1.35 | 0.30 | 11 |
| ε | CM 540 : resin d) + triethylenetetramine (formula value 16) | 1:18 | 22% | 1.35 | 0.30 | 11 |

After the hardening of the prisms, as given in the following, the flexural tensile strength and the compressive strength are measured, and the results obtained are summarised in the following Table:

| Mixture designation | Hardening conditions | Flexural tensile strength kp/cm² | Compressive strength kp/cm² |
|---|---|---|---|
| α | 28 days RT | 81 | 837 |
| β | 14 days RT+ | 80 | 296 |
| γ | 14 days H₂O <br> 14 days RT+ <br> 14 days H₂O | 109 | 661 |
| δ | 28 days H₂O | 110 | 725 |
| ε | 28 days H₂O | 42 | 110 |

In the case of these cement mixtures too, it is shown that strikingly poor mechanical properties are obtained when an amine which does not correspond to the formula I is used.

5. MORTAR

There is produced a mortar mixture with the resin d) and, for comparison, with a polyglycidyl ether of pentaerythritol (PGEPE) as well as with butanediol diglycidyl ether (BDGE), according to the mixing method II. The resulting prisms are allowed to harden for 21 days at 20° C. with 65% relative humdity, and the flexural tensile and the compressive strength are measured; the measurements are repeated after these prisms have been in water for a further 5 days. The results are given in the following Table:

| Mixture | Filing degree | Water: binder | Flexural strength kp/cm² | | Compressive strength kp/cm² | |
|---|---|---|---|---|---|---|
| | | | 21 days CC | +5 days H₂O | 21 days CC | +5 days H₂O |
| resin d) + hardener 4 | 1:20 | 1.4 | 37 | 38 | 223 | 210 |
| PGEPE + hardener 4 | 1:20 | 1.4 | 7 | 4 | 83 | 51 |
| BDGE + | | | | | | |

-continued

| Mixture | Filling degree | Water: binder | Flexural strength kp/cm$^2$ | | Compressive strength kp/cm$^2$ | |
|---|---|---|---|---|---|---|
| | | | 21 days CC | +5 days H$_2$O | 21 days CC | +5 days H$_2$O |
| hardener 4 | 1:20 | 1.4 | 25 | 10 | 140 | 66 |

6. CEMENT MORTAR

The cement mortars CM 540 produced in this Example, which contain on the one hand the resins b) and d) and on the other hand, for comparison, a polyglycidyl ether of pentaerythritol (PGEPE) or butanediol glycidyl ether (BDGE), are produced by the mixing method I or II (see following Table).

| Mixture | Resin/-Hardener | Filling degree | Binder relative to cement | Water: binder | Water: cement | Mode Of addition |
|---|---|---|---|---|---|---|
| α | resin b) hardener 7 | 1:18 | 22% | 1.4 | 0.3 | II |
| β | PGEPE hardener 7 | 1:18 | 22% | 1.4 | 0.3 | II |
| γ | BDGE hardener 7 | 1:18 | 22% | 1.4 | 0.3 | II |
| δ | resin d) hardener 6 | 1:16 | 25% | 1.1 | 0.28 | I |
| ε | PGEPE hardener 6 | 1:16 | 25% | 1.2 | 0.31 | I |
| ζ | resin b) hardener 4 | 1:18 | 22% | 1.4 | 0.3 | II |
| η | BDGE hardener 4 | 1:18 | 22% | 1.4 | 0.3 | II |

After hardening for 28 days, the flexural tensile strength and the compressive strength are measured, and the results obtained are given in the following Table:

| Mixture | Hardening | Flexural tensile strength kp/cm$^2$ | Compressive strength kp/cm$^2$ |
|---|---|---|---|
| α | 28 days under H$_2$O | 88 | 713 |
| β | 28 days under H$_2$O | 77 | 500 |
| γ | 28 days under H$_2$O | 14 | 100 |
| δ | 28 days at RT | 75 | 637 |
| ε | 28 days at RT | 61 | 473 |
| ζ | 28 days under H$_2$O | 97 | 723 |
| η | 28 days under H$_2$O | 61 | 371 |

Mixtures with hydantoin resins give here too specimens having substantially better mechanical properties.

With regard to an article by Lauterbach in Plasticonstruction 1971, pp. 266–272, and a publication by Popovics, First International Congress on Polymer Concretes (May 1975), London, Session B, Paper 9, further comparative tests with water-insoluble epoxide resins based on bisphenol A, which are used as mixed binders in cement mortars, are carried out. There is added in the tests 22-25% of epoxide mixed binder relative to cement, CM type 540, (filling degree 1:16 and 1:18, water/cement = 0.28 to 0.34), in the form of an emulsion, together with the hardener No. 4 or triethylenetetramine; and hardening is effected for 28 days at room temperature, or under water, or partially at room temperature and partially under water. The mean values of eight tests to determine flexural tensile strength and compressive strength are 80 kp/cm$^2$ and 497 kp/cm$^2$, respectively. They are almost equal to or lower than the corresponding values obtained on blank test specimens which are produced without an addition of resin: these values are 75 kp/cm$^2$ and 534 kp/cm$^2$, respectively. The mean values for the flexural strength and compressive strength of specimens prepared using hydantoin resins and hardeners according to the invention (Examples 4, 6 and 7) are 99 kp/cm$^2$ and 717 kp/cm$^2$, respectively, i.e. the values are 24% and 44%, respectively, above those obtained on the specimens containing bisphenol A epoxide resins.

7. CEMENT MORTAR AND MORTAR

In the following are compared the flexural tensile strength and compressive strength of specimens composed of cement mortar Type 540 and mortar, which are produced according to the invention, with the corresponding values obtained on specimens for which there is used as resin ethylene diglycol glycidyl ether (EDGGE), and as hardener triethylenetetramine (TETA).

In the case of the cement mortar (tests CM$_1$, CM$_2$, CM$_3$), the filling degree is 1:16, the binder content 25% relative to cement, the ratio of water to binder 0.93, 0.85 and 0.98, respectively, and the ratio of water to cement 0.23, 0.21 and 0.24, respectively; the additions are made according to I, and hardening is effected in 28 days under water.

In the case of the mortar (tests M$_1$, M$_2$, M$_3$), the filling degree is 1:33, and the ratio of water to binder is 3; the addition procedure is according to II, and hardening is effected firstly during 14 days at room temper; the specimen is subsequently immersed in water.

| Test | Resin | Hardener | Flexural tensile strength kp/cm$^2$ | Compressive strength kp/cm$^2$ |
|---|---|---|---|---|
| CM$_1$ | b) | 4 | 117 | 762 |
| CM$_2$ | EDGGE | 4 | 28 | 112 |

-continued

| Test | Resin | Hardener | Flexural tensile strength kp/cm² | Compressive strength kp/cm² |
|---|---|---|---|---|
| CM₃ | EDGGE | TETA | split open | already after 7 days |
| M₁ | b) | 4 | 10 | 50 |
| M₂ | EDGGE | 4 | decomposed in water after 2 hours | |
| M₃ | EDGGE | TETA | decomposed in water after 1 minute | |

The hydrophilic capacity of cement mortar or mortar with the use of ethylene diglycol glycidyl ether is even greater than that of those containing butanediol glycidyl ether (Example 6).

With use of hardeners other than the above-given hardener No. 4, there is likewise obtained an enhancement of the mechanical properties. In the case of hardening in water, it can be again established that the compressive strength surprisingly increases rather than decreases as is the case with other resins. The type used is CM type 540; and the filling degree is 1:18; there is used 22% of binder to cement; the water/cement factor is 0.3; W/B is 1.35 and the mode of addition is II. Resin b) is used as the epoxide resin in all cases. In the blank tests, the water/cement factor is 0.4.

| | 28 days hardening at room temperature | | 28 days hardening under water | |
|---|---|---|---|---|
| Hardener | Flexural tensile strength kp/cm² | Compressive strength kp/cm² | Flexural tensile strength kp/cm² | Compressive strength kp/cm² |
| No. 16 | 114 | 703 | 93 | 623 |
| No. 8 | 85 | 717 | 94 | 667 |
| No. 5 | 120 | 773 | 99 | 775 |
| blank tests | 73 | 499 | 75 | 534 |

8. BONDING OF LOOSE AGGREGATES

The advantages of the aqueous solutions which are used, according to the invention, as binders for loose aggregates are

- that the water acts as diluting agent, in consequence of which the quantity ratio binder:filler can be adjusted virtually as required;
- that the use of water leads to very low-viscous solutions, so that, with good processing properties, relatively large amounts of fillers can be used;
- that, on account of the low viscosity of the solutions, the wetting of the fillers is effected as a rule without difficulty;
- that hydrophilic fillers, for example substances containing cellulose, are particularly readily wettable;
- that the rate of reaction and hence also the duration of reaction of the solutions, and the hardening time, can be adjusted by alteration of the concentration.

(a) 450 g of glass fibres having a length of 5–6 mm are mixed with a 79% g/v solution of 200 ml of resin b) and 200 ml of standard solution A, with an addition of a green colour paste. This glass fibre paste, in which the ratio of binder to glass fibres is 1:1.4, is applied in a layer thickness of 5–10 mm. The spreadable life of the paste at room temperature is about 30 minutes. The reaction temperature of the paste rises to about 45° C. The mixture has thoroughly hardened after 16 hours.

If a binder solution of 100 ml of resin b) + 100 ml of standard solution A + 100 ml of water is used, and this 53% g/v solution is mixed with 330 g of glass fibres, which corresponds to the ratio 1:2.1, a correspondingly longer spreadable life is obtained, and the hardening, free from stickiness, requires about 30 hours. If the paste is allowed to harden at room temperature and is then placed for 4 weeks in de-ionised water, the required strength is retained.

(b) A 30 cm long plastics tube having a wall thickness of 3 mm and a diameter of 4.4 cm is loosely filled with 120 g of glass fibres having a length of 5–6 mm. From the top is added 260 g of 50% g/g solution of resin b) with hardener 4. The solution runs to the bottom within 6 minutes, with the glass fibres becoming fully saturated and collecting in the lower half of the tube. After 4 weeks' standing at room temperature, a 120 × 25 × 25 mm resin/glass fibre specimen is cut out. The flexural tensile strength (3-point) is 84 kp/cm² and the compressive strength of specimens having dimensions 25 × 25 × 25 mm is 254 kp/cm².

(c) A 79% g/v solution is produced by mixing together 100 ml of resin b) and 100 ml of standard solution B, and 26 g of absorbent paper is impregnated therewith, whereupon pieces of the paper each 27 × 23 cm are placed on top of one another to form four layers. There is obtained a thin hard paper-laminated material which has fully hardened after 48 hours. With use of standard solution A, hardening occurs much more rapidly.

(d) A solution is prepared from 100 ml of resin b), 100 ml of standard solution A and 250 ml of water. The concentration of this solution is 35% (g/v). Into this solution is strewed 450 g of plaster of Paris and then 150 g of glass fibres, 5–6 mm in length, is added by stirring. A glass fibre/plaster of Paris paste 1:3.8 having good processing properties is obtained. The spreadable life, compared with that of a normal mixture of plaster of Paris, is lengthened by several minutes by the addition of the hydantoin resin. A paste is applied with a layer thickness of 2–5 mm. It has become very hard after 16 hours.

9. SHAPED PLASTER OF PARIS SPECIMENS 450 g of plaster of Paris is strewed into 300 g of water, whereupon the plaster paste usually occurring is obtained. There is then added a mixture of 100 g of resin b) and 32 g of hardener 4 to obtain a thinly-liquid, readily pourable plaster of Paris mixture having a quantity ratio of 1:3.4. This is poured into a female mould made of silicone resin. The hardening time, and hence also the spreadable life (pot life), are slightly increased by the addition of hydantoin resin. Compared with a specimen without the resin/hardener addition, the shaped specimen removed from the mould has a surface which is considerably improved mechanically.

10. IMPREGNATION OF CEMENT MORTAR SHEETS AND ASBESTOS SHEETS 75 parts by volume of resin b) and 30 parts by volume of hardener 8 are mixed with water to give a 15% (g/v) solution. 60 ml of this solution is applied with a brush to a cement mortar sheet of 600 cm² (150 g of binder per square meter). This sheet is subjected to the following two tests.

A. Alternating test (= 1 day)
 (a) 3 hours' salt spray test: spraying according to ASTM B 117-64 with 5% NaCl solution at 37° C.,
 (b) 3 hours' standing at −20° C., and
 (c) 18 hours' immersion in water at 20° C.

B. Salt spray test, continuous treatment according to test a).

After 102 alternating tests and 113 days of salt-spray testing, it is shown that the thin layer on the sheet has remained unchanged.

In the same manner is used a 15% solution containing 0.5% of the blue dye of the formula

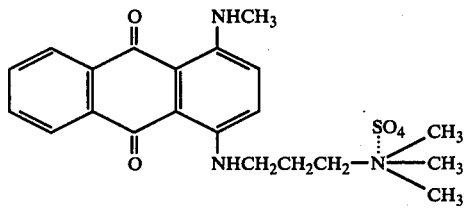

with 200 g of binder per square meter of the sheet surface being applied; In addition, an asbestos sheet is coated with a 5% solution (about 50 g of binder per square meter). The two tests A and B give the same good results. The blue dye has penetrated to a depth of 10–15 mm.

Furthermore, a solution of 46 parts by weight of resin b), 14 parts by weight of hardener 8 and 140 parts by weight of $H_2O$, as well as a few drops of a wetting agent, is applied at 0° C. by brushing to a concrete slab until the slab ceases to absorb, i.e. about 800 g of the 30% solution per square meter (= 240 g of the resin/hardener mixture). After drying, the slab is sealed with a thin closed film, and after 4–5 hours at room temperature it is free from stickiness. After 3 weeks at this temperature, the slab is subjected to a boiling test (6 hours at 98°–100° C.). No change in the hard film can be detected.

It is possible with the aid of the resin/hardener mixtures usable according to the invention to apply to incorrectly laid concrete floors, which are highly porous, impregnations which consolidate the floors either in such a manner that the pores are not completely closed, or in such a manner that the pores are completely sealed. The concentration of the the resin/hardener mixture in water can vary within wide limits. The floors are dry after 20–30 minutes at a temperature of 15° C. With application of very low concentrations, two or more impregnating treatments are necessary. The following for example can be used as impregnating solutions:

(a) 300 ml of resin b) (= 360 g),
 300 ml of standard solution D, and
 2400 ml of water:
 15.4% (g/v) solution with a spreadable life at 12° C. of about 80 minutes;

(b) 300 ml of resin b) (= 360 g),
 300 ml of standard solution C, and
 2400 ml of water:
 15.4% (g/v) solution with a spreadable life at 12° C. of about 30 minutes; and (c) 450 ml of resin b),
 450 ml of standard solution C, and
 2100 ml of water:
 23% (g/v) solution with a spreadable life at 13° C. of about 80 minutes.

After the first impregnation, a sealing can be effected by applying a mixture of equal parts by volume of resin b) and standard solution D (= 77% g/v). The total amount required is 400–450 g of resin/hardener per square meter. The coating is hard. For consolidating alone, without sealing of the pores, the amount required is 250–300 g of resin/hardener per square meter.

Finally, a concrete slab not pretreated can be painted white by applying an aqueous solution containing 29% by weight of resin/hardener, 21% of $TiO_2$ and 50% of water. The resin is b), the hardener is a mixture of 3 parts by weight of hardener 6 and 1 part by weight of hardener 4. The very thinly-liquid preparation is applied, with a brush, in an amount of 400 g per square meter. The coating covers well and at room temperature has hardened after 6 hours.

11. CONSOLIDATION OF SAND AND SOIL

The consolidation of sand or soil can be carried out as follows:

(a) 100 parts of epoxide resin e) are dissolved in 200 parts of water at room temperature, as well as 30 parts of hardener 4 in 170 parts of water. The two solutions are mixed to obtain 500 parts of a 26% solution. This is added to 5000 parts of sand having a grain size of 0.1–0.3 mm and the whole is well mixed. After evaporation of the water, there remains porous, greatly consolidated sand which is now in the form of a solid. Relative to the sand, the proportion of consolidating agent is only 2.6%. Specimens of the consolidated sand, which have been left in water for 9 months at room temperature, show no noticeable loss of the consolidation effect.

(b) 330 ml of epoxide resin f) is dissolved in about 2 liters of water; 110 ml of hardener 8 is then added and the amount is made up with water to 3 liters. To reduce the surface tension, a nonionic wetting agent is added. This approximately 15% (g/v) solution is poured onto about 1.5 square meters of sandy soil. A good consolidation of the surface is obtained after drying at 25° C. air temperature.

12. CONSOLIDATION OF SANDSTONE (a) As is known, sandstones have low resistance to the effects of weather. Sculptures and reliefs made from this stone are destroyed relatively rapidly. The resin/hardener/water mixtures to be used according to the invention are able to substantially increase the compactness of the sandstone particles situated on the surface. A better compactness is likewise necessary where an already partially damaged relief has to be remodeled in order to make a cast of it. Before remodeling, the surface of the brittle sandstone is sprayed with the following solutions: 100 parts by volume of resin b), 100 parts by volume of standard solution A, and 2000 parts by volume of water. A 7.1% (g/v) solution is obtained. Per square meter are used 3.3 liters of solution, i.e. about 230 g of resin and hardener. Hardening is effected at an external temperature of 0°–5° C. within 24 hours. The consolidation effect is fully adequate to be able to remodel with a mortar based on cement.

(b) If cubes 4 × 4 × 4 cm in size are impregnated by immersion in a 10% solution of resin b) and hardener 4, there is obtained an increase of 19% in the compressive strength compared with the compressive strength of the untreated specimen (422 kp/cm² compared with 354 kp/cm²).

13. IMPREGNATION OF WOOD

Pieces of pine wood (18 × 65 × 4 mm) are impregnated in a 15% solution of resin d) and hardener 8 (100:33 parts by weight) (7.5 minutes). After 24 hours at room temperature, the treated pieces of wood are incubated on malt extract/agar provided with Aspergillus niger spores for 7 days at 28° C. The wood specimens are free from growth, whereas the untreated specimens are severely infested. The same phenomenon can be observed with the use of Penicillium funiculosum spores.

We claim:

1. A method of binding loose aggregates which comprises:
   (1) applying to the loose aggregates an aqueous solution consisting of
      (a) an epoxy resin which is completely water-soluble at room temperature and which contains one N-heterocyclic ring in the molecule,
      (b) an amine compound which is soluble in water to the extent of at least 70 percent by weight, which contains at least three hydrogen atoms bound to nitrogen atoms of the amine compound and which satisfies the condition of formula I $$a \cdot w/c) < 14 \qquad (I)$$

wherein a represents the H-active amine equivalent defined by the molecular weight divided by the total number of hydrogen atoms bound to nitrogen of the amine compound,
   w represents the sum of the number of primary, secondary and tertiary amino groups, hydroxyl groups and ether groups, with two ether groups counting as one group, and
   c represents the number of carbon atoms in the molecule or the water-soluble salt thereof; and
   2) hardening the aqueous solution at room temperature.

2. A method according to claim 1, characterised in that as amines there are used those which satisfy the condition of the formula Ia $$\frac{a \cdot w}{c} = 7 \text{ to } 12 \qquad (Ia).$$

3. A method according to claim 1, characterised in that the amines are used in the form of salts from 1 mole of amine and 0.5–1 mole of monobasic acid.

4. A method according to claim 1, characterised in that the aqueous resin/hardener solution has a concentration of 1–90 percent by weight.

5. A method according to claim 1, characterised in that as epoxide resins there are used those having at least one hydantoin ring.

6. A method according to claim 5, characterised in that the epoxide resin used is N,N'-diglycidyl-5,5-dimethyl-hydantoin, or N,N'-diglycidyl-5-methyl-5-ethyl-hydantoin.

7. A method according to claim 5, characterised in that the epoxide resin used is 1-glycidyl-3-(2-glycidyloxy-n-propyl)-5,5-dimethylhydantoin alone or with N,N'-diglycidyl-5-methyl-5-ethyl-hydantoin.

8. A method according to claim 5, characterised in that the epoxide resin used is 1,3-bis-(1-glycidyl-5,5-dimethylhydantoinyl-3)-propanol-2-glycidyl ether.

9. A method according to claim 1, characterised in that the amine used is 3,5,5-trimethyl-3-(aminomethyl)-cyclohexylamine.

10. A method according to claim 1, characterised in that the amine used is trimethylhexamethylenediamine or 1,2-diaminocyclohexane.

11. A method according to claim 1, wherein the loose aggregates are bound with the aqueous solution together with hydraulic cement binders.

12. A method of sealing porous materials which comprises:
   (1) applying to the porous material an aqueous solution consisting of
      (a) an epoxy resin which is completely water-soluble at room temperature and which contains one N-heterocyclic ring in the molecule,
      (b) an amine compound which is soluble in water to the extent of at least 70 percent by weight, which contains at least three hydrogen atoms bound to nitrogen atoms of the amine compound and which satisfies the condition of formula I $$(a \cdot w/c) < 14 \qquad (I)$$

wherein a represents the H-active amine equivalent defined by the molecular weight divided by the total number of hydrogen atoms bound to nitrogen of the amine compound,
   w represents the sum of the number if primary, secondary and tertiary amino groups, hydroxyl groups and ether groups, with two ether groups counting as one group, and
   c represents the number of carbon atoms in the molecule or the water-soluble salt thereof, and
   (2) hardening the aqueous solution at room temperature.

13. A method according to claim 12, characterized in that as amines there are used those which satisfy the condition of formula Ia $$\frac{a \cdot w}{c} = 7 \text{ to } 12 \qquad (Ia)$$

14. A method according to claim 12, characterized in that the amines are used in the form of salts from 1 mole of amine and 0.5–1 mole of monobasic acid.

15. A method according to claim 12, characterized in that the aqueous resin/hardener solution has a concentration of 1–90 percent by weight.

16. A method according to claim 12, characterized in that as epoxide resins there are used those having at least one hydantoin ring.

17. A method according to claim 16, characterized in that the epoxide resin used is N, N'-diglycidyl-5,5-dimethylhydantoin or N,N'-diglycidyl-5-methyl-5-ethylhydantoin.

18. A method according to claim 16, characterized in that the epoxide resin used is 1-glycidyl-3-(2-glycidoxy-n-propyl)-5,5-dimethylhydantoin alone or with N,N'-diglycidyl-5-methyl-5-ethylhydantoin.

19. A method according to claim 16, characterized in that the epoxide resin used is 1,3-bis-(1-glycidyl-5,5-dimethylhydantoinyl-3)-propanol-2-glycidyl ether.

20. A method according to claim 12, characterized in that the amine used is 3,5,5-trimethyl-3-(aminomethyl)-cyclohexylamine.

21. A method according to claim 12, characterized in that the amine used is trimethylhexamethylenediamine or 1,2-diaminocyclohexane.

22. A method according to claim 12 wherein the porous material is selected from concrete, plaster, mortar, clay, limestone, sandstone and wood.

* * * * *